US006816836B2

United States Patent
Basu et al.

(10) Patent No.: US 6,816,836 B2
(45) Date of Patent: Nov. 9, 2004

(54) METHOD AND APPARATUS FOR AUDIO-VISUAL SPEECH DETECTION AND RECOGNITION

(75) Inventors: Sankar Basu, Tenafly, NJ (US); Philippe Christian de Cuetos, Bedford Hills, NY (US); Stephane Herman Maes, Danbury, CT (US); Chalapathy Venkata Neti, Yorktown Heights, NY (US); Andrew William Senior, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/231,676

(22) Filed: Aug. 30, 2002

(65) Prior Publication Data

US 2003/0018475 A1 Jan. 23, 2003

Related U.S. Application Data

(63) Continuation of application No. 09/369,707, filed on Aug. 6, 1999, now Pat. No. 6,594,629.

(51) Int. Cl.[7] .............................................. G10L 15/00
(52) U.S. Cl. ........................ 704/270; 704/246; 382/100
(58) Field of Search ................................. 704/246, 250, 704/251, 270, 275; 382/100, 118

(56) References Cited

U.S. PATENT DOCUMENTS

| | | | | |
|---|---|---|---|---|
| 4,757,541 A | * | 7/1988 | Beadles ...................... | 704/246 |
| 4,975,960 A | * | 12/1990 | Petajan ....................... | 704/252 |
| 5,649,060 A | * | 7/1997 | Ellozy et al. ................ | 704/235 |
| 5,680,481 A | * | 10/1997 | Prasad et al. ................ | 704/252 |
| 6,330,023 B1 | * | 12/2001 | Chen ........................... | 348/13 |

OTHER PUBLICATIONS

C. Neti et al., "Audio–Visual Speaker Recognition For Video Broadcast News," Proceedings of the ARPA HUB4 Workshop, Washington, D.C., pp. 1–3, Mar. 1999.
A.W. Senior, "Face and Feature Finding For a Face Recognition System," Second International Conference on Audio- and Video–based Biometric Person Authentication, Washington, D.C., pp. 1–6, Mar. 1999.
P. De Cuetos et al., "Frontal Pose Detection for Human–Computer Interaction," pp. 1–12, Jun. 23, 1999.
R. Stiefelhagen et al., "Real–Time Lip–Tracking for Lipreading," Interactive Systems Laboratories, University of Karlsruhe, Germany and Carnegie Mellon University, U.S.A., pp. 1–4, Apr. 27, 1998.
P.N. Belhumeur et al., "Eigenfaces vs. Fisherfaces: Recognition Using Class Specific Linear Projection," IEEE Trans. on PAMI, pp. 1–34, Jul. 1997.
N.R. Garner et al., "Robust Noise Detection for Speech Detection and Enhancement," IEE, pp. 1–2, Nov. 5, 1996.
H. Ney, "On the Probabilistic Interpretation of Neural Network Classifiers and Discriminative Training Criteria," IEEE Transactions on Pattern Analysis and Machine Intelligence, vol. 17, No. 2, pp. 107–112, Feb. 1995.
L. Wiskott et al., "Recognizing Faces by Dynamic Link Matching," ICANN '95, Paris, France, pp. 347–352, 1995.

(List continued on next page.)

*Primary Examiner*—Daniel Abebe
(74) *Attorney, Agent, or Firm*—Thu Ann Dang; Ryan, Mason & Lewis, LLP

(57) ABSTRACT

Techniques for providing speech recognition comprise the steps of processing a video signal associated with an arbitrary content video source, processing an audio signal associated with the video signal, and recognizing at least a portion of the processed audio signal, using at least a portion of the processed video signal, to generate an output signal representative of the audio signal.

56 Claims, 9 Drawing Sheets

OTHER PUBLICATIONS

A.H. Gee et al., "Determining the Gaze of Faces in Images," University of Cambridge, Cambridge, England, pp. 1–20, Mar. 1994.

C. Bregler et al., "Eigenlips For Robust Speech Recognition," IEEE, pp. II–669–II–672.

C. Benoît et al., "Which Components of the Face Do Humans and Machines Best Speechread?," Institut de la Communication Parlèe, Grenoble, France, pp. 315–328.

Q. Summerfield, "Use of Visual Information for Phonetic Perception," Visual Information for Phonetic Perception, MRC Institute of Hearing Research, University Medical School, Nottingham, pp. 314–330.

N. Krüger et al., "Determination of Face Position and Pose With a Learned Representation Based on Labeled Graphs," Ruhr–Universität Bochum, Bochum, Germany and University of Southern California, Los Angeles, CA, pp. 1–19.

G. Potamianos et al., "Discriminative Training of HMM Stream Exponents for Audio–Visual Speech Recognition," AT&T Labs Research, Florham and Red Bank, NJ, pp. 1–4.

* cited by examiner

FIG. 12

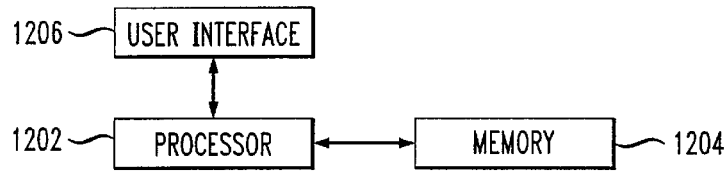

FIG. 13

| DATA TYPE | DIMENSION | SPLICE PARAM. | RECO. RATE |
|---|---|---|---|
| AUDIO ONLY (TRAINING DATA) | 24 | 60 dim | 53.66% |
| VIDEO ONLY (TRAINING DATA) | 100 | 35 dim | 22.21% |
| AUDIO ONLY (TEST DATA) | 24 | 60 dim | 48.08% |
| VIDEO ONLY (TEST DATA) | 100 | 35 dim | 20.15% |
| AUDIO-VIDEO (TRAINING DATA) | 24 + 50 | 35 dim | 53.58% |
| AUDIO-VIDEO (TEST DATA) | 24 + 50 | 35 dim | 48.71% |

TABLE 1: CLEAN DATA EXPERIMENTS ON VVAV DATA

| DATA TYPE | DIMENSION | SPLICE DIM | PHONETIC | VISEMIC |
|---|---|---|---|---|
| AUDIO ONLY (TEST) | 24 | 60 dim | 28.05% | 40.40% |
| VIDEO ONLY (TEST) | 100 | 35 dim | 20.15% | 27.76% |
| AUDIO-VIDEO (TEST) | 24 + 50 | 35 dim | 32.02% | 44.81% |

TABLE 2: NOISE DATA EXPERIMENTS ON VVAV DATA: SPEECH NOISE AT AN AVERAGE OF 15dB, RANGING FROM 10-20 dB SNR. PHONETIC ACCURACY IS SHOWN IN THE FOURTH COLUMN AND VISEMIC ACCURACY IN THE FIFTH COLUMN

| DATA TYPE | DIMENSION | SPLICE PARAM. | RECO. RATE |
|---|---|---|---|
| AUDIO ONLY (TRAINING DATA) | 24 | (60 dim) | 62.17% |
| AUDIO ONLY (TEST DATA) | 24 | (60 dim) | 60.52% |
| VIDEO ONLY (TRAINING DATA) | 100 | (35 dim) | 28.14% |
| VIDEO ONLY (TEST DATA) | 100 | (35 dim) | 27.76% |

TABLE 3: VISEME BASED VIDEO CLASSIFICATION RESULTS

METHOD AND APPARATUS FOR AUDIO-VISUAL SPEECH DETECTION AND RECOGNITION

CROSS REFERENCE TO RELATED APPLICATIONS

This application is a continuation of the U.S. application identified by Ser. No. 09/369,707, filed Aug. 6, 1999, which has since issued as U.S. Pat. No. 6,594,629 on Jul. 15, 2003, the disclosure of which is incorporated by reference herein.

The present application is related to the U.S. patent application identified by Ser. No. 09/369,706, entitled: "Methods And Apparatus for Audio-Visual Speaker Recognition and Utterance Verification" and filed on Aug. 6, 1999, which has since issued as U.S. Pat. No. 6,219,640 on Apr. 17, 2001, the disclosure of which is incorporated by reference herein.

FIELD OF THE INVENTION

The present invention relates generally to speech detection and recognition and, more particularly, to methods and apparatus for using video and audio information to provide improved speech detection and recognition in connection with arbitrary content video.

BACKGROUND OF THE INVENTION

Although significant progress has been made in machine transcription of large vocabulary continuous speech recognition (LVCSR) over the last few years, the technology to date is most effective only under controlled conditions such as low noise, speaker dependent recognition and read speech (as opposed to conversational speech).

In an attempt to improve speech recognition, it has been proposed to augment the recognition of speech utterances with visual cues. This approach has attracted the attention of researchers over the last couple of years, however, most efforts in this domain can be considered to be only preliminary in the sense that, unlike LVCSR efforts, tasks have been limited to small vocabulary (e.g., commands, digits) and often to speaker dependent training or isolated word speech where word boundaries are artificially well defined.

The potential for joint audio-visual-based speech recognition is well established on the basis of psycho-physical experiments, e.g., see D. Stork and M. Henecke, "Speechreading by humans and machines," NATO ASI Series, Series F, Computer and System Sciences, vol.150, Springer Verlag, 1996; and Q. Summerfeld, "Use of visual information for phonetic perception," Phonetica (36), pp. 314–331 1979. Efforts have begun recently on experiments with small vocabulary letter or digit recognition tasks, e.g., see G. Potamianos and H. P. Graf, "Discriminative training of HMM stream exponents for audio-visual speech recognition," ICASSP, 1998; C. Bregler and Y. Konig, "Eigenlips for robust speech recognition," ICSLP, vol II, pp. 669–672, 1994; and R. Stiefelhagen, U. Meier and J. Yang, "Real-time lip-tracking for lipreading," preprint. In fact, canonical mouth shapes that accompany speech utterances have been categorized, and are known as visual phonemes or "visemes." Visemes provide information that complements the phonetic stream from the point of view of confusability. For example, "mi" and "ni" which are confusable acoustically, especially in noisy situations, are easy to distinguish visually: in "mi" lips close at onset, whereas in "ni" they do not. As a further example, the unvoiced fricatives "f" and "s", which are difficult to recognize acoustically, belong to two different viseme groups. However, use of visemes has, to date, been limited to small vocabulary type recognition and the actual video cues have only been derived from controlled or non-arbitrary content video sources.

Thus, it would be highly desirable to provide methods and apparatus for employing visual information in conjunction with corresponding audio information to perform improved speech recognition, particularly, in the context of arbitrary content video.

Another related problem that has plagued conventional speech recognition systems is an inability of the recognizer to discriminate between extraneous audible activity, e.g., background noise or background speech not intended to be decoded, and speech that is indeed intended to be decoded. Due to this deficiency, a speech recognition system typically attempts to decode any signal picked up by its associated microphone whether it be background noise, background speakers, etc. One solution has been to employ a microphone with a push-to-talk button. In such case, the recognizer will only begin to decode audio picked up by the microphone when the speaker pushes the button. However, this approach has obvious limitations. For example, the environment in which the speech recognition system is deployed may not safely permit the user to physically push a button, e.g., a vehicle mounted speech recognition system. Also, once the speaker pushes the button, any extraneous audible activity can still be picked up by the microphone causing the recognizer to attempt to decode it. Thus, it would be highly advantageous to provide methods and apparatus for employing visual information in conjunction with corresponding audio information to accurately detect speech intended to be decoded so that the detection result would serve to automatically turn on/off decoders and/or a microphone associated with the recognition system.

SUMMARY OF THE INVENTION

The present invention provides various methods and apparatus for using visual information and audio information associated with arbitrary video content to provide improved speech recognition accuracy. Further, the invention provides methods and apparatus for using such visual information and audio information to decide whether or not to decode speech uttered by a speaker.

In a first aspect of the invention, a method of providing speech recognition comprises the steps of processing a video signal associated with an arbitrary content video source, processing an audio signal associated with the video signal, and decoding the processed audio signal in conjunction with the processed video signal to generate a decoded output signal representative of the audio signal. The video signal processing operations may preferably include detecting face candidates in the video signal, detecting facial features associated with the face candidates, and deciding whether at least one of the face candidates is in a frontal pose. Fisher linear discriminant (FLD) analysis and distance from face space (DFFS) measures are preferably employed in accordance with these detection techniques. Also, assuming at least one face is detected, visual speech feature vectors are extracted from the video signal. The audio signal processing operation may preferably include extracting audio feature vectors.

In one embodiment, phoneme probabilities are separately computed based on the visual feature vectors and the audio feature vectors. Viseme probabilities may alternatively be computed for the visual information. The probability scores are then combined, preferably using a confidence measure, to form joint probabilities which are used by a search engine to produce a decoded word sequence representative of the audio signal. In another embodiment, the visual feature vectors and the audio feature vectors are combined such that a single set of probability scores are computed for the combined audio-visual feature vectors. Then, these scores are used to produce the decoded output word sequence. In yet another embodiment, scores computed based on the information in one path are used to re-score results in the other path. A confidence measure may be used to weight the re-scoring that the other path provides.

In a second aspect of the invention, a method of providing speech detection in accordance with a speech recognition system comprises the steps of processing a video signal associated with a video source to detect whether one or more features associated with the video signal are representative of speech, and processing an audio signal associated with the video signal in accordance with the speech recognition system to generate a decoded output signal representative of the audio signal when the one or more features associated with the video signal are representative of speech. In one embodiment, a microphone associated with the speech recognition system is turned on such that an audio signal from the microphone may be initially buffered if at least one mouth opening is detected from the video signal. Then, the buffered audio signal is decoded in accordance with the speech recognition system if mouth opening pattern recognition indicates that subsequent portions of the video signal are representative of speech. The decoding operation results in a decoded output word sequence representing the audio signal. While the above embodiment relates to making the speech detection decision based on video information only, a decision could be made using audio information only.

Still further, the invention provides for performing event detection using both the visual information and the audio information simultaneously. Thus, the system looks not only at the mouth movement but also looks to the audio signal to make a determination of whether the received audio signal is speech or not speech. In such an embodiment, an utterance verification procedure, as will be explained, is used to provide this form of event detection.

Of course, it is to be appreciated that any one of the above embodiments or processes may be combined with one or more other embodiments or processes to provide even further speech recognition and speech detection improvements.

Also, it is to be appreciated that the video and audio signals may be of a compressed format such as, for example, the MPEG-2 standard. The signals may also come from either a live camera/microphone feed or a stored (archival) feed. Further, the video signal may include images of visible and/or non-visible (e.g., infrared or radio frequency) wavelengths. Accordingly, the methodologies of the invention may be performed with poor lighting, changing lighting, or no light conditions. Still further, the audio signal may be representative of conversational speech such that improved LVCSR is accomplished. Given the inventive teachings provided herein, one of ordinary skill in the art will contemplate various applications of the invention.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 12 is a block diagram of an illustrative hardware implementation of an audio-visual speech detection and recognition system according to the invention; and FIG. 13 are tabular representations of some experimental results.

DETAILED DESCRIPTION OF PREFERRED EMBODIMENTS

The present invention will be explained below in the context of an illustrative speech recognition implementation. However, it is to be understood that the present invention is not limited to a particular application or structural embodiment. Rather, the invention is more generally applicable to any situation in which it is desirable to improve speech recognition accuracy and provide automatic speech detection by employing visual information in conjunction with corresponding audio information during the recognition process.

Figure 1:
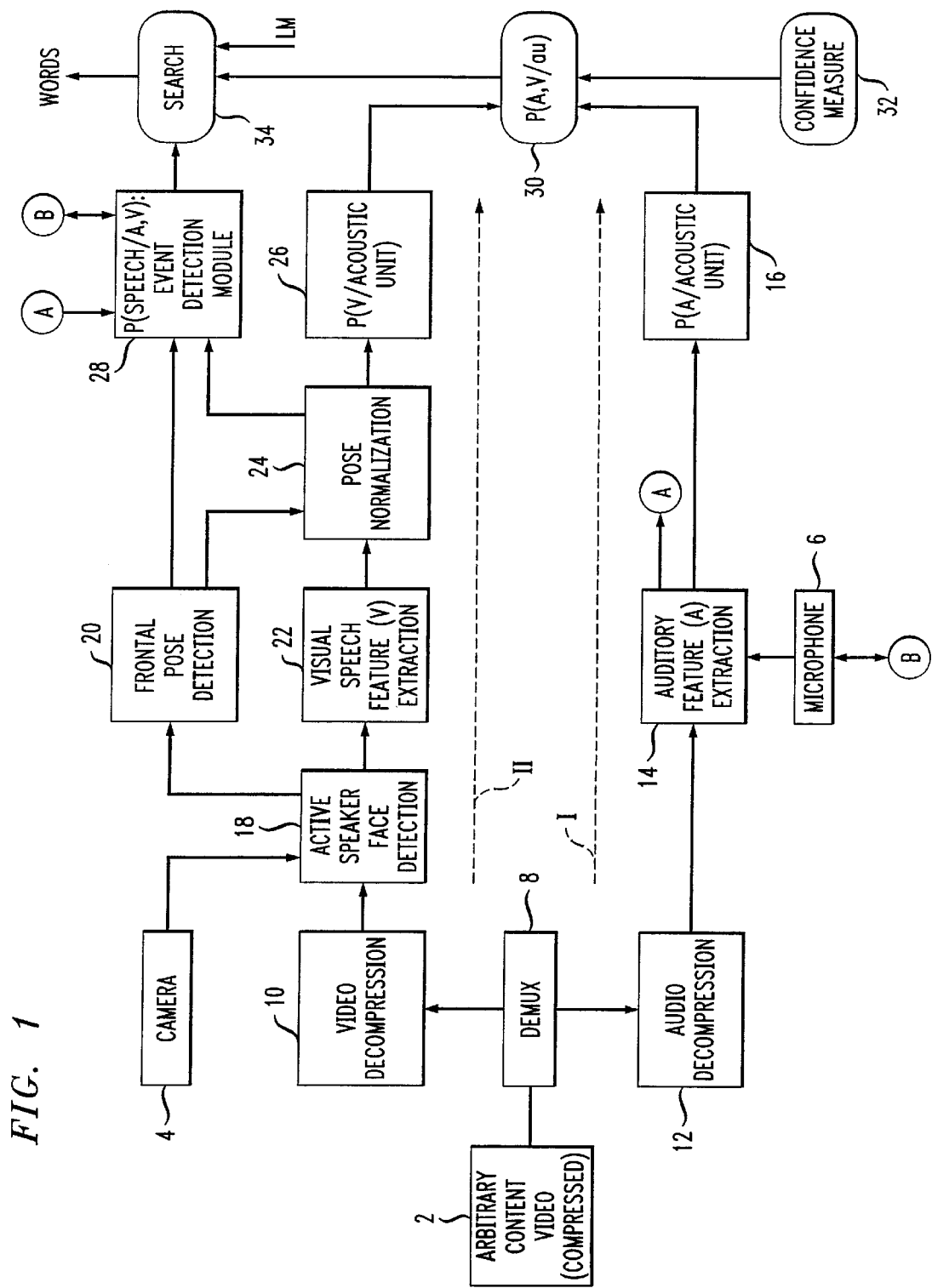
FIG. 1 is a block diagram of an audio-visual speech detection and recognition system according to an illustrative decision fusion embodiment of the present invention.

Referring initially to FIG. 1, a block diagram of an audio-visual speech detection and recognition system according to an illustrative embodiment of the present invention is shown. This particular illustrative embodiment, as will be explained, depicts audio-visual recognition using a decision fusion approach.

It is to be appreciated that the system of the invention may receive input signals from a variety of sources. That is, the input signals for processing in accordance with the invention may be provided from a real-time (e.g., live feed) source or an archival (e.g., stored) source. Arbitrary content video 2 is an input signal that may be received from either a live source or archival source. Preferably, the system may accept, as arbitrary content video 2, video compressed in accordance with a video standard such as the Moving Picture Expert Group-2 (MPEG-2) standard. To accommodate such a case, the system includes a video demultiplexer 8 which separates the compressed audio signal from the compressed video signal. The video signal is then decompressed in video decompressor 10, while the audio signal is decompressed in audio decompressor 12. The decompression algorithms are standard MPEG-2 techniques and thus will not be further described. In any case, other forms of compressed video may be processed in accordance with the invention.

It is to be further appreciated that one of the advantages that the invention provides is the ability to process arbitrary content video. That is, previous systems that have attempted to utilize visual cues from a video source in the context of speech recognition have utilized video with controlled conditions, i.e., non-arbitrary content video. That is, the video content included only faces from which the visual cues were taken in order to try to recognize short commands or single words in a predominantly noiseless environment. However, as will be explained in detail below, the system of the present invention is able to process arbitrary content video which may not only contain faces but may also contain arbitrary background objects in a noisy environment. One example of arbitrary content video is in the context of broadcast news. Such video can possibly contain a newsperson speaking at a location where there is arbitrary activity and noise in the background. In such a case, as will be explained, the invention is able to locate and track a face and, more particularly, a mouth, to determine what is relevant visual information to be used in more accurately recognizing the accompanying speech provided by the speaker.

Alternatively, the system of the present invention is capable of receiving real-time arbitrary content directly from a video camera 4 and microphone 6. While the video signals received from the camera 4 and the audio signals received from the microphone 6 are shown in FIG. 1 as not being compressed, they may be compressed and therefore need to be decompressed in accordance with the applied compression scheme.

It is to be understood that the video signal captured by the camera 4 does not necessarily have to be of any particular type. That is, the face and pose detection techniques of the invention may process images of any wavelength such as, e.g., visible and/or non-visible electromagnetic spectrum images. By way of example only, this may include infrared (IR) images (e.g., near, mid and far field IR video) and radio frequency (RF) images. Accordingly, the system may perform audio-visual speech detection and recognition techniques in poor lighting conditions, changing lighting conditions, or in environments without light. For example, the system may be installed in an automobile or some other form of vehicle and capable of capturing IR images so that improved speech recognition may be performed. Because video information (i.e., including visible and/or non-visible electromagnetic spectrum images) is used in the speech recognition process in accordance with the invention, the system is less susceptible to recognition errors due to noisy conditions, which significantly hamper conventional recognition systems that use only audio information. In addition, due to the inventive methodologies for processing the visual information, the invention provides the capability to perform accurate LVCSR, whereas conventional speech recognition systems which utilize visual cues are capable of only processing single commands or words.

A phantom line denoted by Roman numeral I represents the processing path the audio information signal takes within the system, while a phantom line denoted by Roman numeral II represents the processing path the video information signal takes within the system. First, the audio signal path I will be discussed, then the video signal path II, followed by an explanation of how the two types of information are combined to provide improved recognition accuracy.

The system includes an auditory feature extractor 14. The feature extractor 14 receives an audio or speech signal and, as is known in the art, extracts spectral features from the signal at regular intervals. The spectral features are in the form of acoustic feature vectors (signals) which are then passed on to a probability module 16. As mentioned, the audio signal may be received from the audio decompressor 12 or directly from the microphone 6, depending on the source of the video. Before acoustic vectors are extracted, the speech signal may be sampled at a rate of 16 kilohertz (kHz). A frame may consist of a segment of speech having a 25 millisecond (msec) duration. In such an arrangement, the extraction process preferably produces 24 dimensional acoustic cepstral vectors via the process described below. Frames are advanced every 10 msec to obtain succeeding acoustic vectors.

First, in accordance with a preferred acoustic feature extraction process, magnitudes of discrete Fourier transforms of samples of speech data in a frame are considered in a logarithmically warped frequency scale. Next, these amplitude values themselves are transformed to a logarithmic scale. The latter two steps are motivated by a logarithmic sensitivity of human hearing to frequency and amplitude. Subsequently, a rotation in the form of discrete cosine transform is applied. One way to capture the dynamics is to use the delta (first-difference) and the delta-delta (second-order differences) information. An alternative way to capture dynamic information is to append a set of (e.g., four) preceding and succeeding vectors to the vector under consideration and then project the vector to a lower dimensional space, which is chosen to have the most discrimination. The latter procedure is known as Linear Discriminant Analysis (LDA) and is well known in the art.

After the acoustic feature vectors, denoted in FIG. 1 by the letter A, are extracted, the probability module labels the extracted vectors with one or more previously stored phonemes which, as is known in the art, are sub-phonetic or acoustic units of speech. Each phoneme associated with one or more feature vectors has a probability associated therewith indicating the likelihood that it was that particular acoustic unit that was spoken. Thus, the probability module yields likelihood scores for each considered phoneme in the form of the probability that, given a particular phoneme or acoustic unit (au), the acoustic unit represents the uttered speech characterized by one or more acoustic feature vectors A or, in other words, P(A|acoustic unit). It is to be appreciated that the processing performed in blocks 14 and 16 may be accomplished via any conventional acoustic information recognition system capable of extracting and labeling acoustic feature vectors, e.g., Lawrence Rabiner, Biing-Hwang Juang, "Fundamentals of Speech Recognition," Prentice Hall, 1993.

Referring now to the video signal path II of FIG. 1, the methodologies of processing visual information according to the invention will now be explained. The audio-visual speech detection and recognition system of the invention includes an active speaker face detection module 18. The active speaker face detection module 18 can receive video input from one or more sources, e.g., video decompressor 10, camera 4, as explained above. It is to be appreciated that speaker face detection can also be performed directly in the compressed data domain and/or from audio and video information rather than just from video information. In any case, module 18 generally locates and tracks the speaker's face and facial features within the arbitrary video background. This will be explained in detail below.

The audio-visual speech detection and recognition system of the invention also preferably includes a frontal pose detection module 20. It is to be understood that the detection module 20 serves to determine whether a speaker in a video frame is in a frontal pose. This serves the function of reliably determining when someone is likely to be uttering or is likely to start uttering speech that is meant to be processed by the system, e.g., recognized by the system. Thus, background noise is not recognized as though it were speech, and the starts of utterances are not mistakenly discarded. It is to be appreciated that not all speech acts performed within the hearing of the system are intended for the system. The user may not be speaking to the system, but to another person present or on the telephone. Accordingly, the system of the invention implements a detection module 20 such that the modality of vision is used in connection with the modality of speech to determine when to perform certain functions in auditory and visual speech recognition.

One way to determine when a user is speaking to the system is to detect when he is facing the camera and when his mouth indicates a speech or verbal activity. This copies human behavior well. That is, when someone is looking at you and moves his lips, this indicates, in general, that he is speaking to you. We assume, in a preferred implementation, that when a user is facing the camera, this will be interpreted by the system as if he is ready to communicate with it. In the case of archival videos, the same frontal pose detection may be performed in order to detect whose speech in the video frame to recognize.

Figure 2A:
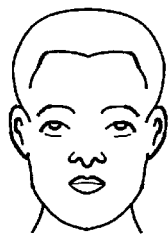
FIGS. 2A through 2C are exemplary diagrams of frontal face poses according to an illustrative embodiment of the present invention.
Figure 2B:
Figure 2C:
Figure 3A:
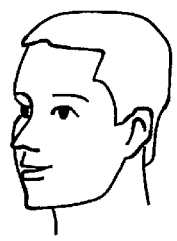
FIGS. 3A through 3B are exemplary diagrams of non-frontal face poses according to an illustrative embodiment of the present invention.
Figure 3B:
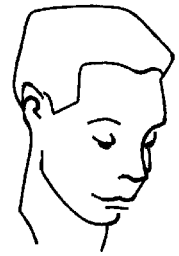

In accordance with the face detection module 18 and frontal pose detection module 20, we detect the "frontalness" of a face pose in the video image being considered. We call a face pose "frontal" when a user is considered to be: (i) more or less looking at the camera; or (ii) looking directly at the camera (also referred to as "strictly frontal"). Thus, in a preferred embodiment, we determine "frontalness" by determining that a face is absolutely not frontal (also referred to as "non-frontal"). A non-frontal face pose is when the orientation of the head is far enough from the strictly frontal orientation that the gaze cannot be interpreted as directed to the camera nor interpreted as more or less directed at the camera. Examples of what are considered frontal face poses and non-frontal face poses in a preferred embodiment are shown in FIGS. 2A through 2C and FIGS. 3A and 3B. FIGS. 2A through 2C illustrate face poses where the user's face is considered frontal, and FIGS. 3A and 3B illustrate face poses where the user's face is considered non-frontal.

Figure 4:
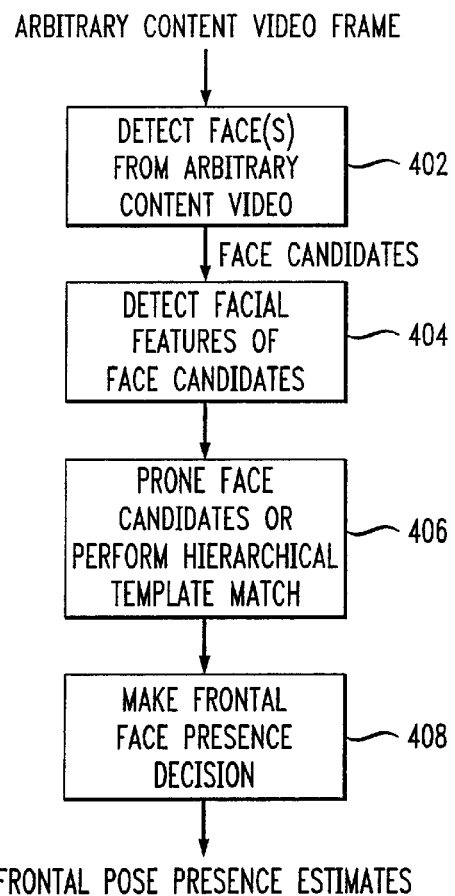
FIG. 4 is a flow diagram of a face/feature and frontal pose detection methodology according to an illustrative embodiment of the present invention.

Referring to FIG. 4, a flow diagram of an illustrative method of performing face detection and frontal pose detection according to the invention is shown. Further details of the various steps will be explained following an outline of the illustrative method. The first step (step 402) is to detect face candidates in an arbitrary content video frame received from the camera 4 or video decompressor 10. Next, in step 404, we detect facial features on each candidate such as, for example, nose, eyes, mouth, ears, etc. Thus, we have all the information necessary to prune the face candidates according to their frontalness, in step 406. That is, we remove candidates that do not have sufficient frontal characteristics, e.g., a number of well detected facial features and distances between these features. An alternate process in step 406 to the pruning method involves a hierarchical template matching technique, also explained in detail below. In step 408, if at least one face candidate exists after the pruning mechanism, it is determined that a frontal face is in the video frame being considered.

There are several ways to solve the general problem of pose detection. First, a geometric method suggests to simply consider variations of distances between some features in a two dimensional representation of a face (i.e., a camera image), according to the pose. For instance, on a picture of a slightly turned face, the distance between the right eye and the nose should be different from the distance between the left eye and the nose, and this difference should increase as the face turns. We can also try to estimate the facial orientation from inherent properties of a face. In the article by A. Gee and R. Cipolla, "Estimating Gaze from a Single View of a Face," Tech. Rep. CUED/F-INFENG/TR174, March 1994, it is suggested that the facial normal is estimated by considering mostly pose invariant distance ratios within a face.

Another way is to use filters and other simple transformations on the original image or the face region. In the article by R. Brunelli, "Estimation of pose and illuminant direction for face processing," Image and Vision Computing 15, pp. 741–748, 1997, for instance, after a preprocessing stage that tends to reduce sensitivity to illumination, the two eyes are projected on the horizontal axis and the amount of asymmetry yields an estimation of the rotation of the face.

In methods referred to as training methods, one tries to "recognize" the face pose by modeling several possible poses of the face. One possibility is the use of Neural Networks like Radial Basic Function (RBF) networks as described in the article by A. J. Howell and Hilary Buxton, "Towards Visually Mediated Interaction Using Appearance-Based Models," CSRP 490, June 1998. The RBF networks are trained to classify images in terms of pose classes from low resolution pictures of faces.

Another approach is to use three dimensional template matching. In the article by N. Kruger, M. Potzch, and C. von der Malsburg, "Determination of face position and pose with a learned representation based on labeled graphs," Image and Vision Computing 15, pp. 665–673, 1997, it is suggested to use a three dimensional elastic graph matching to represent a face. Each node is associated with a set of Gabor jets and the similarity between the candidate graph and the templates for different poses can be optimized by deforming the graph.

Of course, these different ways can be combined to yield better results. Almost all of these methods assume that a face has been previously located on a picture, and often assume that some features in the face like the eyes, the nose and so on, have been detected. Moreover some techniques, especially the geometric ones, rely very much on the accuracy of this feature position detection.

But face and feature finding on a picture is a problem that also has many different solutions. In a preferred embodiment, we consider it as a two-class detection problem which is less complex than the general pose detection problem that aims to determine face pose very precisely. By two-class detection, as opposed to multi-class detection, we mean that a binary decision is made between two options, e.g., presence of a face or absence of a face, frontal face or non-frontal face, etc. While one or more of the techniques described above may be employed, the techniques we implement in a preferred embodiment are described below.

In such a preferred embodiment, the main technique employed by the active speaker face detection module 18 and the frontal pose detection module 20 to do face and feature detection is based on Fisher Linear Discriminant (FLD) analysis. A goal of FLD analysis is to get maximum discrimination between classes and reduce the dimensionality of the feature space. For face detection, we consider two classes: (i) the In-Class, which comprises faces, and; (ii) the Out-Class, composed of non-faces. The criterion of FLD analysis is then to find the vector of the feature space $\vec{w}$ that maximizes the following ratio:

$$J(\vec{w}) = \frac{\vec{w}^t S_B \vec{w}}{\vec{w}^t S_W \vec{w}} \quad (1)$$

where $S_B$ is the between-class scatter matrix and $S_W$ the within-class scatter matrix. Having found the right $\vec{w}$ (which is referred to as the FLD), we then project each feature vector $\vec{x}$ on it by computing $\vec{w}^t \vec{x}$ and compare the result to a threshold in order to decide whether $\vec{x}$ belongs to the In-Class or to the Out-Class. It should be noted that we may use Principal Component Analysis (PCA), as is known, to reduce dimensionality of the feature space prior to finding the vector of the feature space $\vec{w}$ that maximizes the ratio in equation (1), e.g., see P. N. Belhumeur, J. P. Hespanha, and D. J. Kriegman, "Eigenfaces vs. Fisherfaces: Recognition Using Class Specific Linear Projection," IEEE Transactions on Pattern Analysis and Machine Intelligence, vol. 19, no. 7, July 1997.

Face detection (step 402 of FIG. 4) involves first locating a face in the first frame of a video sequence and the location is tracked across frames in the video clip. Face detection is preferably performed in the following manner. For locating a face, an image pyramid over permissible scales is generated and, for every location in the pyramid, we score the surrounding area as a face location. After a skin-tone segmentation process that aims to locate image regions in the pyramid where colors could indicate the presence of a face, the image is sub-sampled and regions are compared to a previously stored diverse training set of face templates using FLD analysis. This yields a score that is combined with a Distance From Face Space (DFFS) measure to give a face likelihood score. As is known, DFFS considers the distribution of the image energy over the eigenvectors of the covariance matrix. The higher the total score, the higher the chance that the considered region is a face. Thus, the locations scoring highly on all criteria are determined to be faces. For each high scoring face location, we consider small translations, scale and rotation changes that occur from one frame to the next and re-score the face region under each of these changes to optimize the estimates of these parameters (i.e., FLD and DFFS). DFFS is also described in the article by M. Turk and A. Pentland, "Eigenfaces for Recognition," Journal of Cognitive Neuro Science, vol. 3, no. 1, pp. 71–86, 1991. A computer vision-based face identification method for face and feature finding which may be employed in accordance with the invention is described in Andrew Senior, "Face and feature finding for face recognition system," $2^{nd}$ Int. Conf. On Audio-Video based Biometric Person Authentication, Washington D.C., March 1999.

A similar method is applied, combined with statistical considerations of position, to detect the features within a face (step 404 of FIG. 4). Notice that this face and feature detection technique is designed to detect strictly frontal faces only, and the templates are intended only to distinguish strictly frontal faces from non-faces: more general frontal faces are not considered at all.

Of course, this method requires the creation of face and feature templates. These are generated from a database of frontal face images. The training face or feature vectors are added to the In-Class and some Out-Class vectors are generated randomly from the background in our training images.

Figure 5:
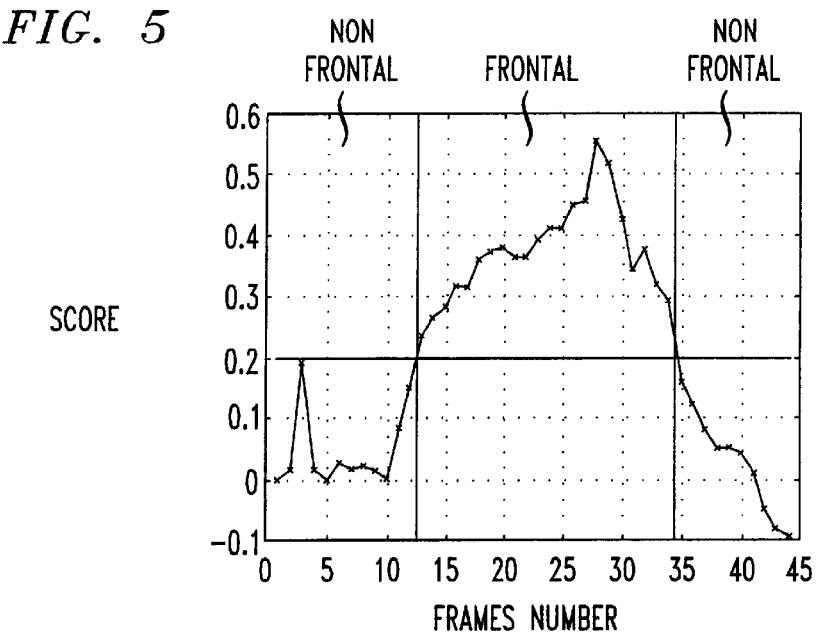
FIG. 5 is a graphical representation of score thresholding according to the invention.

In a score thresholding technique, the total score may be compared to a threshold to decide whether or not a face candidate or a feature candidate is a true face or feature. This score, being based on FLD analysis, has interesting properties for the practical pose detection problem. Indeed, for a given user, the score varies as the user is turning his head, e.g., the score being higher when the face is more frontal. FIG. 5 depicts an example of a total face score, generated according to this technique, from a video of a woman turning her head. The database used to compute the template includes a number of faces taken from video also, but which does not include the face of the woman being tested. We see that by setting a threshold of 0.2, we can distinguish frontal faces from non-frontal faces. However, other thresholds may be used.

Then, having already a method to detect strictly frontal faces and features in it, we adapt it as closely as possible for our two-class detection problem. In a preferred embodiment, the invention provides two alternate ways to adapt (step 406 of FIG. 4) the detection method: (i) a pruning mechanism and; (ii) a hierarchical template matching technique.

Pruning Mechanism

Here, we reuse templates already computed for face detection. Our face and feature detection technique only needs strictly frontal faces training data and thus we do not require a broader database. The method involves combining face and feature detection to prune non-frontal faces. We first detect faces in the frame according to the algorithm we have discussed above, but intentionally with a low score threshold. This low threshold allows us to detect faces that are far from being strictly frontal, so that we do not miss any more or less frontal faces. Of course, this yields the detection of some profile faces and even non-faces. Then, in each candidate, we estimate the location of the face features (eyes, nose, lips, etc.).

The false candidates are pruned from the candidates according to the following independent computations:

(i) The sum of all the facial feature scores: this is the score given by our combination of FLD and DFFS. The sum is to be compared to a threshold to decide if the candidate should be discarded.

(ii) The number of main features that are well recognized: we discard candidates with a low score for the eyes, the nose and the mouth. Indeed, these are the most characteristic and visible features of a human face and they differ a lot between frontal and non-frontal faces.

(iii) The ratio of the distance between each eye and the center of the nose.

(iv) The ratio of the distance between each eye and the side of the face region (each face is delimited by a square for template matching, see, e.g., A. Senior reference cited above. Particularly, the ratio is the distance of the outer extremity of the left eye from the medial axis over the distance of the outer extremity of the right eye from the medial axis. The ratio depends on the perspective angle of the viewer and can therefore be used as a criterion.

These ratios, for two-dimensional projection reasons, will differ from unity, the more the face is non-frontal. So, we compute these ratios for each face candidate and compare them to unity to decide if the candidate has to be discarded or not.

Then, if one or more face candidates remain in the candidates stack, we will consider that a frontal face has been detected in the considered frame.

Finally, for practical reasons, we preferably use a burst mechanism to smooth results. Here, we use the particularity of our interactive system: since we consider a user who is (or is not) in front of the camera, we can take its behavior in time into account. As the video camera is expected to take pictures from the user at a high rate (typically 30 frames per second), we can use the results of the former frames to predict the results in the current one, considering that humans move slowly compared to the frame rate.

So, if a frontal face has been detected in the current frame, we may consider that it will remain frontal in the next x frames (x depends on the frame rate). Of course, this will add some false positive detections when the face actually becomes non-frontal from frontal as the user turns his head or leaves, but we can accept some more false positive detections if we get lower false negative detections. Indeed, false negative detections are worse for our human-computer interaction system than false positive ones: it is very important to not miss a single word of the user speech, even if the computer sometimes listens too much.

This pruning method has many advantages. For example, it does not require the computation of a specific database: we can reuse the one computed to do face detection. Also, compared to simple thresholding, it discards some high score non-faces, because it relies on some face-specific considerations such as face features and face geometry.

Hierarchical Template Matching

Another solution to solve our detection problem is to modify the template matching technique. Indeed, our FLD computation technique does not consider "non-frontal" faces at all: In-Class comprises only "strictly frontal" faces and Out-Class only non-faces. So, in accordance with this alternate embodiment, we may use other forms of templates such as:

(i) A face template where the In-Class includes frontal faces as well as non-frontal faces, unlike the previous technique, and where the Out-Class includes comprises non-frontal faces.

(ii) A pose template where the In-Class includes strictly frontal faces and the Out-Class includes non-frontal faces.

The use of these two templates allows us to do a hierarchical template matching. First, we do template matching with the face template in order to compute a real face-likelihood score. This one will indicate (after the comparison with a threshold) if we have a face (frontal or non-frontal) or a non-face. Then, if a face has been actually detected by this matching, we can perform the second template matching with the pose template that, this time, will yield a frontalness-likelihood score.

Figure 6:
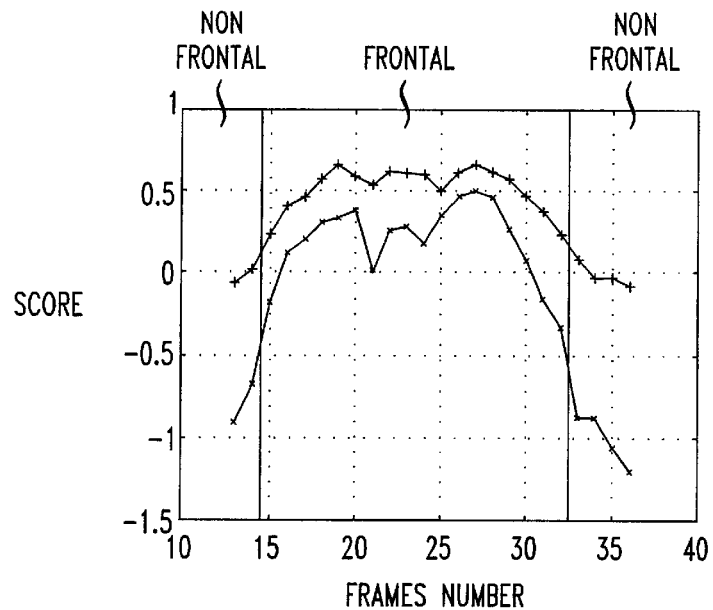
FIG. 6 is a graphical representation of scoring using hierarchical template matching according to the invention.

This final pose score has better variations from non-frontal to frontal faces than the previous face score. FIG. 6 depicts total scores computed using the hierarchical template method using the same video clip of a woman's head used for the data illustrated in the graph of FIG. 5. Thus, FIG. 6 shows a total score for the same video of the woman who turns her head but using templates of 20 users from an independent database of still full-frontal images. We compare the scores given by the classic template matching (top curve ++++) and the ones given by the hierarchical template matching (bottom curve xxxx). We see that with the hierarchical method, we have more variations of the score.

Thus, the hierarchical template method makes it easier to find a less user independent threshold so that we could solve our problem by simple face finding score thresholding. One advantage of the hierarchical template matching method is that the pose score (i.e., the score given by the pose template matching) is very low for non-faces (i.e., for non-faces that could have been wrongly detected as faces by the face template matching), which helps to discard non-faces.

Figure 7:
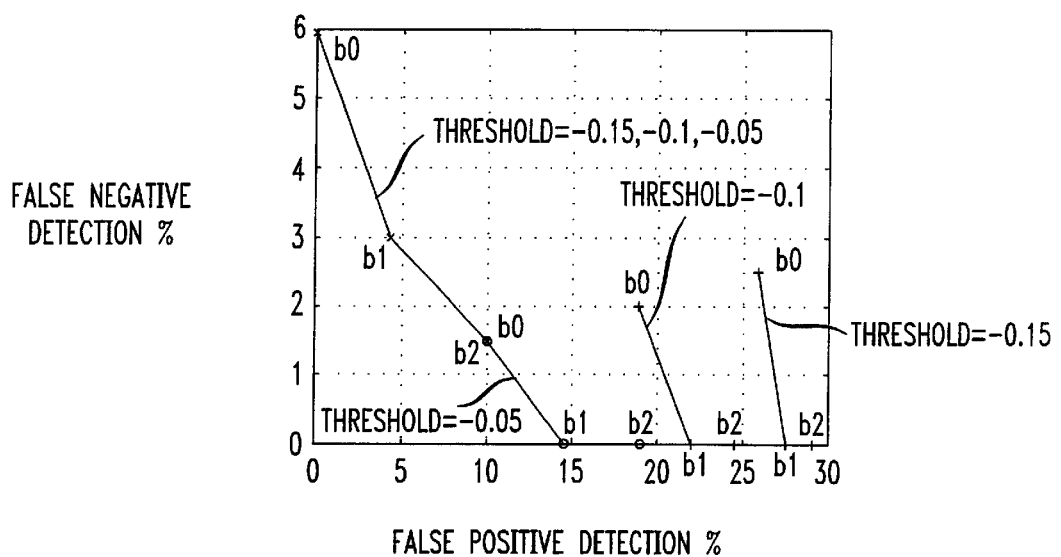
FIG. 7 is a graphical representation of a comparison of scoring between score thresholding and pruning according to the invention.

We now compare the results given by the simple thresholding method and those given by the pruning method. This comparison is depicted in FIG. 7. The false and positive detection ratios are computed from the total results of the experiments. Poses that can be considered as the limit between frontal and non-frontal will lead to positive or negative decisions depending on the user and its associated face finding score. Indeed, our system can avoid the ambiguity of the limit pose by adaptation of the user: the user can slightly adapt his head if he notices bad results. FIG. 7 shows the ROC (receiver operating curve) for frontal pose detection for several values of burst (b0,b1,b2) and several values of the face finding score threshold (−0.05,−0.1,−0.15). The first curve on the left is the pruning method whereas the others are realized from the simple thresholding method. The test has been made from a template of faces, computed from video shots, and a test video of 130 frames of frontal and non-frontal faces from 3 different users.

The ROC for the pruning method is globally closer to the point (0,0) and the axis than the curves for the simple thresholding method. That is a sign of better results. Besides, we see clearly that the pruning method is more user-independent than the simple thresholding method as the results are the same whatever the threshold value is. The rate of false negatives is a bit higher for the pruning method (and the difference should be more negligible for a longer video) than for the simple thresholding method, but the rate of false positives is at least 10% lower for the same value of burst.

Given the results of either the pruning method or the hierarchical template matching method, one or more frontal pose presence estimates are output by the module 20 (FIG. 1). These estimates (which may include the FLD and DFFS parameters computed in accordance with modules 18 and 20) represent whether or not a face having a frontal pose is detected in the video frame under consideration. These estimates are used by an event detection module 28, along with the audio feature vectors A extracted in module 14 and visual speech feature vectors V extracted in a visual speech feature extractor module 22, explained below.

Returning now to FIG. 1, the visual speech feature extractor 22 extracts visual speech feature vectors (e.g., mouth or lip-related parameters), denoted in FIG. 1 as the letter V, from the face detected in the video frame by the active speaker face detector 18.

Examples of visual speech features that may be extracted are grey scale parameters of the mouth region; geometric/model based parameters such as area, height, width of mouth region; lip contours arrived at by curve fitting, spline parameters of inner/outer contour; and motion parameters obtained by three dimensional tracking. Still another feature set that may be extracted via module 22 takes into account the above factors. Such technique is known as Active Shape modeling and is described in Iain Matthews, "Features for audio visual speech recognition," Ph.D dissertation, School of Information Systems, University of East Angalia, January 1998.

Thus, while the visual speech feature extractor 22 may implement one or more known visual feature extraction techniques, in one embodiment, the extractor extracts grey scale parameters associated with the mouth region of the image. Given the location of the lip corners, after normalization of scale and rotation, a rectangular region containing the lip region at the center of the rectangle is extracted from the original decompressed video frame. Principal Component Analysis (PCA), as is known, may be used to extract a vector of smaller dimension from this vector of grey-scale values.

Another method of extracting visual feature vectors that may be implemented in module 22 may include extracting geometric features. This entails extracting the phonetic/visemic information from the geometry of the lip contour and its time dynamics. Typical parameters may be the mouth corners, the height or the area of opening, the curvature of inner as well as the outer lips. Positions of articulators, e.g., teeth and tongue, may also be feature parameters, to the extent that they are discernable by the camera.

The method of extraction of these parameters from grey scale values may involve minimization of a function (e.g., a cost function) that describes the mismatch between the lip contour associated with parameter values and the grey scale image. Color information may be utilized as well in extracting these parameters.

From the captured (or demultiplexed and decompressed) video stream one performs a boundary detection, the ultimate result of which is a parameterized contour, e.g., circles, parabolas, ellipses or, more generally, spline contours, each of which can be described by a finite set of parameters.

Still other features that can be extracted include two or three dimensional wire-frame model-based techniques of the type used in the computer graphics for the purposes of animation. A wire-frame may consist of a large number of triangular patches. These patches together give a structural representation of the mouth/lip/jaw region, each of which contain useful features in speech-reading. These parameters could also be used in combination with grey scale values of the image to benefit from the relative advantages of both schemes.

The extracted visual speech feature vectors are then normalized in block 24 with respect to the frontal pose estimates generated by the detection module 20. The normalized visual speech feature vectors are then provided to a probability module 26. Similar to the probability module 16 in the audio information path which labels the acoustic feature vectors with one or more phonemes, the probability module 26 labels the extracted visual speech vectors with one or more previously stored phonemes. Again, each phoneme associated with one or more visual speech feature vectors has a probability associated therewith indicating the likelihood that it was that particular acoustic unit that was spoken in the video segment being considered. Thus, the probability module yields likelihood scores for each considered phoneme in the form of the probability that, given a particular phoneme or acoustic unit (au), the acoustic unit represents the uttered speech characterized by one or more visual speech feature vectors V or, in other words, P(V|acoustic unit). Alternatively, the visual speech feature vectors may be labeled with visemes which, as previously mentioned, are visual phonemes or canonical mouth shapes that accompany speech utterances.

Next, the probabilities generated by modules 16 and 26 are jointly used by A,V probability module 30. In module 30, the respective probabilities from modules 16 and 26 are combined based on a confidence measure 32. Confidence estimation refers to a likelihood or other confidence measure being determined with regard to the recognized input. Recently efforts have been initiated to develop appropriate confidence measures for recognized speech. In LVCSR Hub5 Workshop, Apr. 29–May 1, 1996, MITAGS, MD, organized by NIST and DARPA, different approaches are proposed to attach to each word a confidence level. A first method uses decision trees trained on word-dependent features (amount of training utterances, minimum and average triphone occurrences, occurrence in language model training, number of phonemes/lefemes, duration, acoustic score (fast match and detailed match), speech or non-speech), sentence-dependent features (signal-to-noise ratio, estimates of speaking rates: number of words or of lefemes or of vowels per second, sentence likelihood provided by the language model, trigram occurrence in the language model), word in a context features (trigram occurrence in language model) as well as speaker profile features (accent, dialect, gender, age, speaking rate, identity, audio quality, SNR, etc . . . ). A probability of error is computed on the training data for each of the leaves of the tree. Algorithms to build such trees are disclosed, for example, in Breiman et al., "Classification and regression trees," Chapman & Hall, 1993. At recognition, all or some of these features are measured during recognition and for each word the decision tree is walked to a leave which provides a confidence level. In C. Neti, S. Roukos and E. Eide "Word based confidence measures as a guide for stack search in speech recognition," ICASSP97, Munich, Germany, April, 1997, is described a method relying entirely on scores returned by IBM stack decoder (using log-likelihood—actually the average incremental log-likelihood, detailed match, fast match). In the LVCSR proceeding, another method to estimate the confidence level is done using predictors via linear regression. The predictor used are: the word duration, the language model score, the average acoustic score (best score) per frame and the fraction of the N-Best list with the same word as top choice.

The present embodiment preferably offers a combination of these two approaches (confidence level measured via decision trees and via linear predictors) to systematically extract the confidence level in any translation process, not limited to speech recognition. Another method to detect incorrectly recognized words is disclosed in the U.S. patent application identified by docket no. YO997-002 and entitled "Apparatus and Methods for Speech Recognition Including Individual or Speaker Class Dependent Decoding History Caches for Fast Word Acceptance or Rejection," the disclosure of which is incorporated herein by reference.

Thus, based on the confidence measure, the probability module 30 decides which probability, i.e., the probability from the visual information path or the probability from the audio information path, to rely on more. This determination may be represented in the following manner:

$$w_1 v_p + w_2 a_p. \qquad (2)$$

It is to be understood that $v_p$ represents a probability associated with the visual information, $a_p$ represents a probability associated with the corresponding audio information, and $w_1$ and $w_2$ represent respective weights. Thus, based on the confidence measure 32, the module 30 assigns appropriate weights to the probabilities. For instance, if the surrounding environmental noise level is particularly high, i.e., resulting in a lower acoustic confidence measure, there is more of a chance that the probabilities generated by the acoustic decoding path contain errors. Thus, the module 30 assigns a lower weight for $w_2$ than for $w_1$ placing more reliance on the decoded information from the visual path. However, if the noise level is low and thus the acoustic confidence measure is relatively higher, the module may set $w_2$ higher than $w_1$. Alternatively, a visual confidence measure may be used. It is to be appreciated that the first joint use of the visual information and audio information in module 30 is referred to as decision or score fusion. An alternative embodiment will be explained later that implements feature fusion.

Then, a search is performed in search module 34 with language models (LM) based on the weighted probabilities received from module 30. That is, the acoustic units identified as having the highest probabilities of representing what was uttered in the arbitrary content video are put together to form words. The words are output by the search engine 34 as the decoded system output. A conventional search engine may be employed.

In a preferred embodiment, the system of the invention also includes an event detection module 28. As previously mentioned, one problem of conventional speech recognition systems is their inability to discriminate between extraneous audible activity, e.g., background noise or background speech not intended to be decoded, and speech that is indeed intended to be decoded. This causes such problems as misfiring of the system and "junk" recognition. According to various embodiments of the invention, the system may use information from the video path only, information from the audio path only, or information from both paths simultaneously to decide whether or not to decode information. This is accomplished via the event detection module 28. It is to be understood that "event detection" refers to the determination of whether or not an actual speech event that is intended to be decoded is occurring or is going to occur. Based on the output of the event detection module, microphone 6 or the search engine 34 may be enabled/disabled.

Figure 8A:
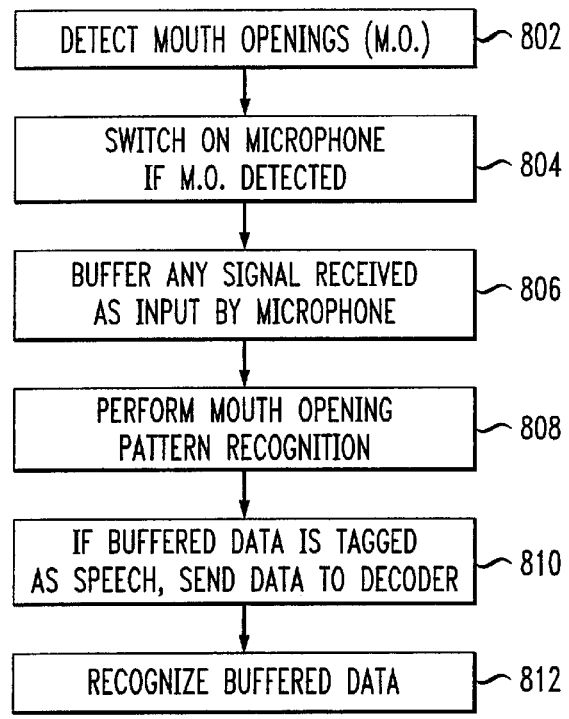
FIG. 8A is a flow diagram of an event detection methodology according to an illustrative embodiment of the present invention.

Referring now to FIG. 8A, an illustrative event detection method using information from the video path only to make the detection decision is shown. To make this determination, the event detection module 28 receives input from the frontal pose detector 20, the visual feature extractor 24 (via the pose normalization block 26), and the audio feature extractor 14.

First, in step 802, any mouth openings on a face identified as "frontal" are detected. This detection is based on the tracking of the facial features associated with a detected frontal face, as described in detail above with respect to modules 18 and 20. If a mouth opening or some mouth motion is detected, microphone 6 is turned on, in step 804. Once the microphone is turned on, any signal received therefrom is stored in a buffer (step 806). Then, mouth opening pattern recognition (e.g., periodicity) is performed on the mouth movements associated with the buffered signal to determine if what was buffered was in fact speech (step 808). This is determined by comparing the visual speech feature vectors to pre-stored visual speech patterns consistent with speech. If the buffered data is tagged as speech, in step 810, the buffered data is sent on through the acoustic path so that the buffered data may be recognized, in step 812, so as to yield a decoded output. The process is repeated for each subsequent portion of buffered data until no more mouth openings are detected. In such case, the microphone is then turned off. It is to be understood that FIG. 8A depicts one example of how visual information (e.g., mouth openings) is used to decide whether or not to decode an input audio signal. The event detection module may alternatively control the search module 34, e.g., turning it on or off, in response to whether or not a speech event is detected. Thus, the event detection module is generally a module that decides whether an input signal captured by the microphone is speech given audio and corresponding video information or, P(Speech|A,V).

It is also to be appreciated that the event detection methodology of the invention may be performed using the audio path information only. In such case, the event detection module 28 may perform one or more speech-only based detection methods such as, for example: signal energy level detection (e.g., is audio signal above a given level); signal zero crossing detection (e.g., are there high enough zero crossings); voice activity detection (non-stationarity of the spectrum) as described in, e.g., N. R. Garner et al., "Robust noise detection for speech recognition and enhancement," Electronics letters, February 1997, vol. 33, no. 4, pp. 270–271; D. K. Freeman et al., "The voice activity detector of the pan-European digital mobile telephone service," IEEE 1989, CH2673-2; N. R. Garner, "Speech detection in adverse mobile telephony acoustic environments," to appear in Speech Communications; B. S Atal et al., "A pattern recognition approach to voiced-unvoiced-silence classification with applications to speech recognition, IEEE Trans. Acoustic, Speech and Signal Processing, vol. ASSP-24 n3, 1976. See also, L. R. Rabiner,"Digital processing of speech signals," Prentice-hall, 1978.

Figure 8B:
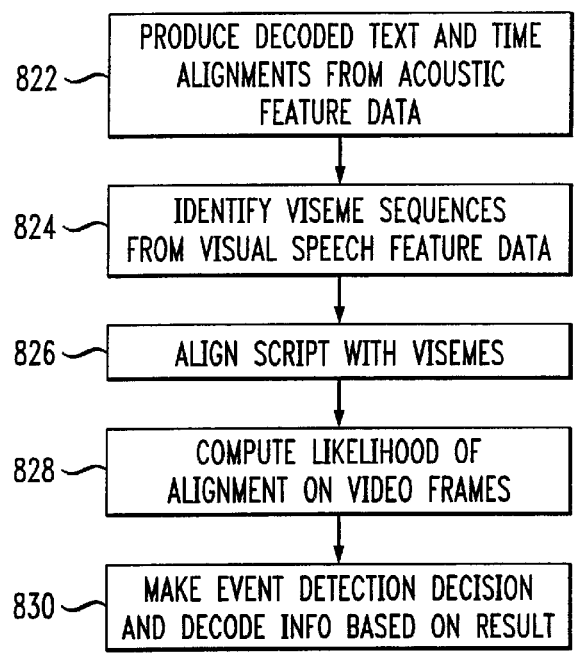
FIG. 8B is a flow diagram of an event detection methodology employing utterance verification according to an illustrative embodiment of the present invention.

Referring now to FIG. 8B, an illustrative event detection method simultaneously using both information from the video path and the audio path to make the detection decision is shown. The flow diagram illustrates unsupervised utterance verification methodology as also described in the U.S. patent application identified by docket no. YO999-318 and entitled: "Methods And Apparatus for Audio-Visual Speaker Recognition and Utterance Verification," filed concurrently herewith and incorporated by reference herein. In the unsupervised mode, utterance verification is performed when the text (script) is not known and available to the system.

Thus, in step 822, the uttered speech to be verified may be decoded by classical speech recognition techniques so that a decoded script and associated time alignments are available. This is accomplished using the feature data from the acoustic feature extractor 14. Contemporaneously, in step 824, the visual speech feature vectors from the visual feature extractor 22 are used to produce a visual phonemes (visemes) sequence.

Next, in step 826, the script is aligned with the visemes. A rapid (or other) alignment may be performed in a conventional manner in order to attempt to synchronize the two information streams. For example, in one embodiment, rapid alignment as disclosed in the U.S. patent application identified by Ser. No. 09/015,150 (docket no. YO997-386) and entitled "Apparatus and Method for Generating Phonetic Transcription from Enrollment Utterances," the disclosure of which is incorporated by reference herein, may be employed. Then, in step 828, a likelihood on the alignment is computed to determine how well the script aligns to the visual data. The results of the likelihood are then used, in step 830, to decide whether an actual speech event occurred or is occurring and whether the information in the paths needs to be recognized.

The system of the invention may apply one of, a combination of two of, or all three of, the approaches described above in the event detection module 28 to perform event detection. Video information only based detection is useful so that the system can do the detection when the background noise is too high for a speech only decision. The audio only approach is useful when speech occurs without a visible face present. The combined approach offered by unsupervised utterance verification improves the decision process when a face is detectable with the right pose to improve the acoustic decision.

Besides minimizing or eliminating recognition engine misfiring and/or "junk" recognition, the event detection methodology provides better modeling of background noise, that is, when no speech is detected, silence is detected. Also, for embedded applications, such event detection provides additional advantages. For example, the CPU associated with an embedded device can focus on other tasks instead of having to run in a speech detection mode. Also, a battery power savings is realized since speech recognition engine and associated components may be powered off when no speech is present. Other general applications of this speech detection methodology include: (i) use with visible electromagnetic spectrum image or non-visible electromagnetic spectrum image (e.g., far IR camera in vehicle-based speech detection or noisy environment; (ii) speaker detection in an audience to focus local or array microphones; (iii) speaker recognition (as in the above-referenced U.S. patent application identified by docket no. YO999-318) and tagging in broadcast news or TeleVideo conferencing. One of ordinary skill in the art will contemplate other applications given the inventive teachings described herein.

Figure 9:
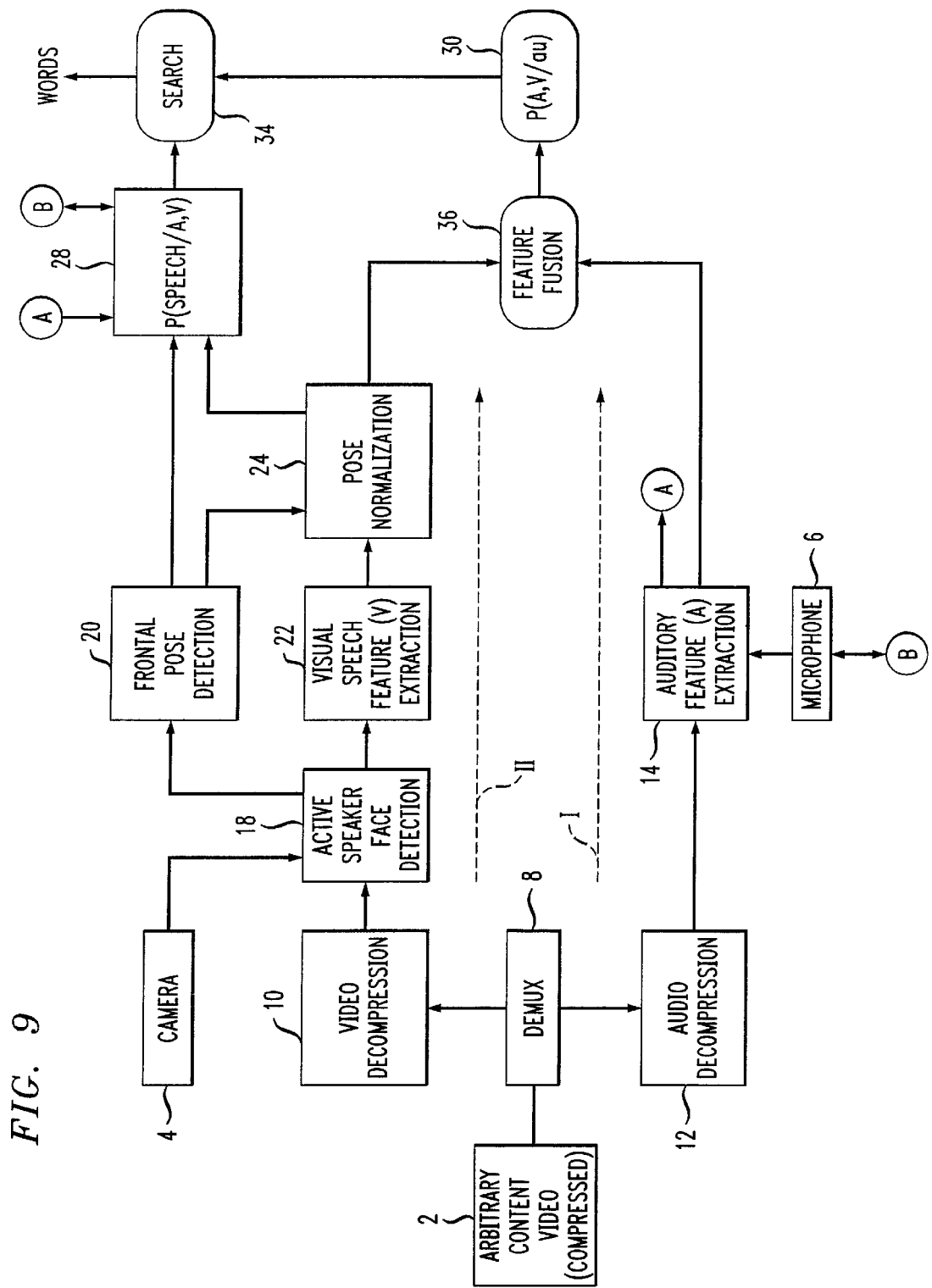
FIG. 9 is a block diagram of an audio-visual speech detection and recognition system according to an illustrative feature fusion embodiment of the present invention.

Referring now to FIG. 9, an alternative embodiment of an audio-visual speech detection and recognition system is shown. Whereas the embodiment of FIG. 1 illustrated a decision or score fusion approach, the embodiment of FIG. 9 illustrates a feature fusion approach. The operations of the system of FIG. 9 are substantially the same as those described above with respect to FIG. 1, however, the embodiment of FIG. 9 has the added advantage of requiring only one probability scoring step, that is, the scoring performed by probability module 30. This is due to the fact that, in accordance with the feature fusion approach, a single feature vector is built combining acoustic features (e.g., mel cepstra and derivatives) and visual features (e.g., lip shape parameters). Such combining of features is accomplished via the feature fusion module 36. The feature fusion module receives, as input, the visual speech feature vectors V from extractor 22 (via pose normalizer 24) from the video information path and the auditory feature vectors A from extractor 14 from the audio information path.

These features are then combined to form a single audio-visual feature vector. There are many ways to perform this combination. One way is to concatenate the audio feature data and the visual feature data. However, since MPEG-2 decompressed video produces 30 frames per second, whereas the audio frames are spaced approximately 10 msec in time, there is a need for synchronization between features. The requirement for a larger frame rate in the audio domain is fulfilled by creating artificial frames by interpolation from adjoining video frames. Different conventional interpolation techniques can be used for this purpose. Examples are linear interpolation from frames immediately preceding and following the time instant, or other polynomial interpolation techniques such as ones which consider more than one frame in the past and future of the time instant when the audio frame occurs.

The single audio-visual feature vectors are then provided to probability module 30 where probabilities are assigned to phonemes and/or visemes, as described above. The search module 34 then produces the decoded output.

Figure 10:
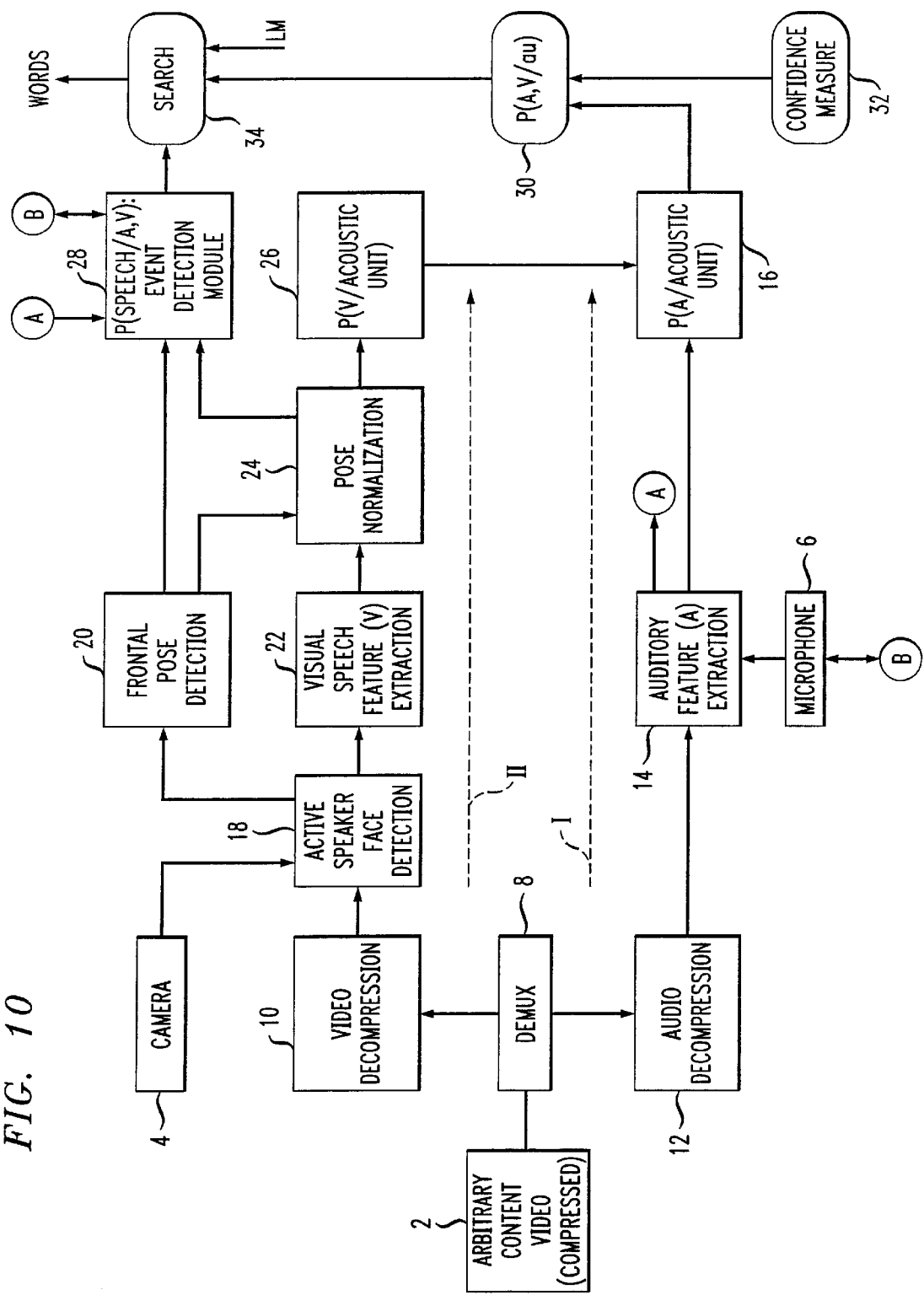
FIG. 10 is a block diagram of an audio-visual speech detection and recognition system according to an illustrative re-scoring embodiment of the present invention.
Figure 11:
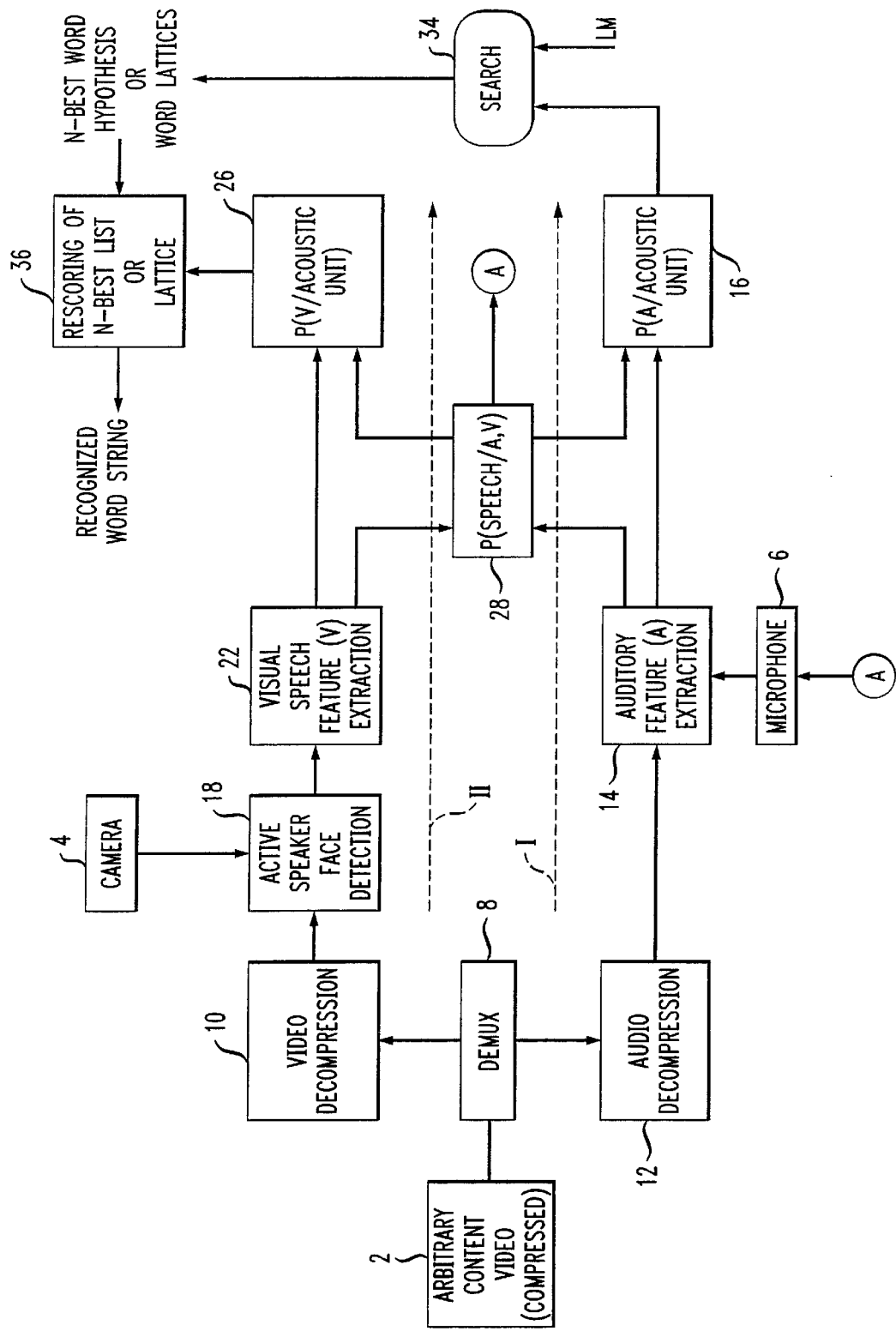
FIG. 11 is a block diagram of an audio-visual speech detection and recognition system according to another illustrative re-scoring embodiment of the present invention.

Referring now to FIGS. 10 and 11, alternative embodiments of an audio-visual speech detection and recognition system are shown. These embodiments illustrate a serial re-scoring approach. The operations of the system of FIGS. 10 and 11 are substantially the same as those described above with respect to FIG. 1, however, the embodiments of FIGS. 10 and 11 have the added advantage of using the probability scores computed based on the visual information and audio information in a serial manner. For instance, we first decode or recognize the utterance based on the audio stream alone. Then, instead of yielding the most probable word string, a number of alternative possible outputs are made available from the speech recognizer. Each alternative has associated with it a likelihood (or probability) of being the correct utterance. In conventional audio-only decoders, the utterance with the highest likelihood is recognized, whether correct or not. In accordance with the invention, we generate probability models obtained independently from training the visual data stream. Thus, for example, a set of N-best alternative hypotheses obtained on the basis of audio-only decoding can be considered as candidates for further evaluation. This can be done by evaluating the likelihoods of these N candidate hypotheses on the basis of probability density models associated with video-only data. Finally, these latter likelihoods are compared and the utterance having the largest value of this re-scored likelihood is chosen to be the decoded word stream. It is to be appreciated that the roles of the audio and video can be reversed. That is, the audio data can be used to re-score the results yielded by the video data. Two illustrative embodiments are described below in the context of FIGS. 10 and 11.

As shown in FIG. 10, the probability module 26, which generates probability scores based on the visual information, is connected to the acoustic probability module 16. In this way, a set of probability scores are first generated from the audio information (along path I) and, if the scores are not believed to be accurate based, for example, on the confidence measure 32, then the visual speech probabilities (generated from path II) are used to re-compute the scores (re-score) so that new, more reliable scores are produced. Accordingly, the visual data is used to limit the acoustic hypotheses. The joint probabilities can then be weighted as explained above with respect to equation (2). Alternatively, it is to be appreciated that the acoustic data may be used to re-score the visual data.

The embodiment in FIG. 11 is similar to that in FIG. 10, however, here, the re-scoring or re-computing is done after the search module 34. Thus, a decoded output word sequence (e.g., N-best word hypothesis or word lattices) is re-computed using the visual information only if the original decoded output word sequence, generated solely from the audio information, is not believed to be accurate. The re-scoring is performed by module 36. Thus, a decoded output word sequence is first generated from the audio information (along path I) and, if the output is not believed to be accurate based, then the visual speech probabilities (generated from path II) are used to re-compute or re-score the output so that a new, more reliable output word sequence is produced using data from both paths.

However, as mentioned above, the re-scoring approach does not necessarily have to be based on the determination that results from one modality path are not believed to be accurate. Rather, the re-scoring approach provides for using the results in one modality path to modify results of the other modality path. For example, the system can re-score the audio results (or N-best list) or detailed match stage based on the video information. Conversely, the system can re-score the decoded video stream based on the acoustic results.

Also as shown in FIG. 11, the re-scoring embodiment may employ an event detection methodology (block 28) to control the microphone 6 and/or the probability modules 16 and 26 so that decoding operations begin and occur only when facial features consistent with speech are detected. However, it is to be understood that event detection according to the invention may be implemented in any of the embodiments described herein, as well as other speech recognition implementations.

Referring to FIG. 12, a block diagram of an illustrative hardware implementation of an audio-visual speech detection and recognition system according to the invention is shown. In this particular implementation, a processor 1202 for controlling and performing the various operations associated with the illustrative systems of the invention depicted in FIGS. 1 and 9–11 is coupled to a memory 1204 and a user interface 1206. It is to be appreciated that the term "processor" as used herein is intended to include any processing device, such as, for example, one that includes a CPU (central processing unit). For example, the processor may be a digital signal processor, as is known in the art. Also the term "processor" may refer to more than one individual processor. The term "memory" as used herein is intended to include memory associated with a processor or CPU, such as, for example, RAM, ROM, a fixed memory device (e.g., hard drive), a removable memory device (e.g., diskette), a flash memory, etc. In addition, the term "user interface" as used herein is intended to include, for example, one or more input devices, e.g., keyboard, for inputting data to the processing unit, and/or one or more output devices, e.g., CRT display and/or printer, for providing results associated with the processing unit. The user interface 1206 may also include a microphone for receiving user speech.

Accordingly, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIGS. 1 and 9–11 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Experimental Results

The audio-visual data we experiment with is provided by the LDC (Linguistic Data Consortium, University of Pennsylvania). The audio part of the data is a subset of the standard speech recognition evaluation conducted by the DARPA community (known as the HUB4 effort). The speech database consists of large vocabulary (approximately 60,000 words) continuous speech drawn from a variety of news broadcasts. The entire database includes television (e.g., CNN, CSPAN) as well as radio shows. We focus on segments of this data, the video part of which primarily consists of the "talking head" type images (e.g., an anchor person in a CNN newscast). The audio-video data available from LDC in the analog SVHS format is digitized in MPEG-2 format (at a rate of 5 Mb/sec). The audio and video streams are then de-multiplexed and decompressed. The resulting decompressed audio is sampled at a rate of 16 kHz and the video at a standard rate of 30 frames/second.

The audio sampling rate of 16 kHz is chosen so as to be able to compare the joint audio-visual recognition results with the audio-only HUB4 evaluation experiments. While this is an ongoing data collection effort, at the present time we have about 700 video clips of approximately 10–15 seconds duration each (the entire HUB4 database is approximately 200 hrs. of speech data).

In summary, we use a database of large vocabulary continuous visual speech transmitted over a broadcast channel. The fact that it is real-life data (as opposed to data collected in controlled environments) distinguishes this from existing databases. For purposes of validation of results, we also collected "read" large vocabulary continuous visual speech. This data was collected in acoustically quiet, controlled conditions and the resolution of the lip region in the video image was much larger than in the LDC data mentioned above—thus making video based recognition a more tractable task. For the purpose of fair comparison with the LDC data, the video digitization parameters and audio sampling frequency were kept the same. We label this data the 'ViaVoice Audio-Visual' (VVAV) data.

We report specific results on the joint audio-video phonetic classification and its comparison with audio-only and video-only classification. For video, we experiment with both the phonetic classification and a 'viseme' based approach as described above. One approach to labeling the video feature vectors is to label the speech data from a Viterbi alignment and to subsequently use a phoneme to viseme mapping. To produce phonetic alignments of the audio data, we use the acoustic models trained using the DARPA HUB4 speech recognition data. The video frame rates are typically lower than the audio frame rate. This is circumvented by inter-frame interpolation, as explained above. In all experiments, the LDC HUB4-video database of continuous large vocabulary speech mentioned is used.

In the following experiments, 672 audio-video clips of VVAV data were used as the training set. The test set consisted of 36 different clips taken from the same database. All the experiments use LDA features. In the phonetic/visemic classification, each phone/viseme is modeled as a mixture of 5 gaussians.

A comparison of tables 1 and 2 of FIG. 13 shows that audio-visual recognition in acoustically degraded conditions is better than either of the two streams processed independently. An approximate improvement of 14% is obtained compared to audio-only classification scheme.

We used the following grouping of phonemes into viseme classes:

(AA, AH, AX), (AE), (AO), (AW), (AXR, ER), (AY), (CH), (EH), (EY), (HH), (IH, IX), (IY), (JH), (L), (OW), (OY), (R), (UH, UW), (W), (X, D$), (B, BD, M, P, PD), (D, DD, DX, G, GD, K, KD, N, NG, T, TD, Y), (TS), (F, V), (S, Z), (SH, ZH), (TH, DH).

When visemes are used as classes, the video classification improves by about 37.5%, relative. However, improvement in noisy conditions is about the same for visemic classes. Table 3 of FIG. 13 shows viseme based classification results. In our preliminary experiments with HUB4 broadcast news data, we get the following results: audio-only phonetic classification accuracy is 33.98%; video-only phonetic classification accuracy using 35 dimensional LDA features is 9.48%.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of providing speech recognition, the method comprising the steps of:

processing a video signal associated with an arbitrary content video source;

processing an audio signal associated with the video signal; and recognizing at least a portion of the processed audio signal, using at least a portion of the processed video signal, to generate an output signal representative of the audio signal.

2. The method of claim 1, wherein the audio signal is representative of conversational speech.

3. The method of claim 1, wherein the video signal processing operation comprises the step of detecting whether the video signal associated with the arbitrary content video source contains one or more face candidates.

4. The method of claim 3, wherein the video signal processing operation further comprises the step of detecting one or more facial features on one or more detected face candidates.

5. The method of claim 4, wherein the video signal processing operation further comprises the step of detecting whether the one or more detected facial features are characteristic of respective face candidates in frontal poses.

6. The method of claim 5, wherein at least one of face, facial feature and pose detection employ Fisher linear discriminant (FLD) analysis.

7. The method of claim 5, wherein at least one of face, facial feature and pose detection employ a distance from face space (DFFS) measure.

8. The method of claim 3, wherein the video signal processing operation comprises the step of extracting visual feature vectors from the video signal when a face is detected, the visual feature vectors representing one or more facial features of the detected face.

9. The method of claim 8, wherein the visual feature vectors represent grey scale parameters.

10. The method of claim 8, wherein the visual feature vectors represent geometric features.

11. The method of claim 8, wherein the visual feature vectors are normalized with respect to pose estimates.

12. The method of claim 8, wherein the audio signal processing operation comprises the step of extracting audio feature vectors from the associated audio signal, the audio feature vectors representing one or more acoustic features of the audio signal.

13. The method of claim 12, wherein probabilities are assigned to phonemes based on the audio feature vectors.

14. The method of claim 13, wherein probabilities are assigned to one of phonemes and visemes based on the visual feature vectors.

15. The method of claim 14, wherein respective joint probabilities are formed from corresponding probabilities associated with the visual feature vectors and the audio feature vectors.

16. The method of claim 15, wherein, in forming the joint probabilities, the corresponding probabilities associated with the visual feature vectors and the audio feature vectors are assigned weights based on a confidence measure.

17. The method of claim 16, wherein the joint probabilities are used to search for an appropriate output signal representative of the audio signal.

18. The method of claim 17, wherein the acoustic probabilities are used to search for a word hypothesis representative of the audio signal.

19. The method of claim 18, wherein the word hypothesis is re-calculated using the visual probabilities to generate an appropriate output signal representative of the audio signal.

20. The method of claim 12, wherein visual feature vectors are combined with corresponding audio feature vectors to form audio-visual feature vectors.

21. The method of claim 20, wherein probabilities are assigned to one of phonemes and visemes based on the audio-visual feature vectors.

22. The method of claim 21, wherein the probabilities are used to search for an appropriate output signal representative of the audio signal.

23. The method of claim 1, wherein at least one of the video signal and the audio signal are compressed signals.

24. The method of claim 1, wherein compressed signals are decompressed prior to processing operations.

25. The method of claim 1, wherein the arbitrary content video source provides MPEG-2 standard signals.

26. The method of claim 1, wherein the video signal includes at least one of visible electromagnetic spectrum images, non-visible electromagnetic spectrum images, and images from other sensing techniques.

27. Apparatus for providing speech recognition, the apparatus comprising:

at least one processor operable to: (i) process a video signal associated with an arbitrary content video source; (ii) process an audio signal associated with the video signal; and (iii) recognize at least a portion of the processed audio signal, using at least a portion of the processed video signal, to generate an output signal representative of the audio signal; and memory, coupled to the at least one processor, for storing at least a portion of results associated with at least one of the processing and recognizing operations.

28. The apparatus of claim 27, wherein the audio signal is representative of conversational speech.

29. The apparatus of claim 27, wherein the video signal processing operation comprises the step of detecting whether the video signal associated with the arbitrary content video source contains one or more face candidates.

30. The apparatus of claim 29, wherein the video signal processing operation further comprises the step of detecting one or more facial features on one or more detected face candidates.

31. The apparatus of claim 30, wherein the video signal processing operation further comprises the step of detecting whether the one or more detected facial features are characteristic of respective face candidates in frontal poses.

32. The apparatus of claim 31, wherein at least one of face, facial feature and pose detection employ Fisher linear discriminant (FLD) analysis.

33. The apparatus of claim 31, wherein at least one of face, facial feature and pose detection employ a distance from face space (DFFS) measure.

34. The apparatus of claim 29, wherein the video signal processing operation comprises the step of extracting visual feature vectors from the video signal when a face is detected, the visual feature vectors representing one or more facial features of the detected face.

35. The apparatus of claim 34, wherein the visual feature vectors represent grey scale parameters.

36. The apparatus of claim 34, wherein the visual feature vectors represent geometric features.

37. The apparatus of claim 34, wherein the visual feature vectors are normalized with respect to pose estimates.

38. The apparatus of claim 34, wherein the audio signal processing operation comprises the step of extracting audio feature vectors from the associated audio signal, the audio feature vectors representing one or more acoustic features of the audio signal.

39. The apparatus of claim 38, wherein probabilities are assigned to phonemes based on the audio feature vectors.

40. The apparatus of claim 39, wherein probabilities are assigned to one of phonemes and visemes based on the visual feature vectors.

41. The apparatus of claim 40, wherein respective joint probabilities are formed from corresponding probabilities associated with the visual feature vectors and the audio feature vectors.

42. The apparatus of claim 41, wherein, in forming the joint probabilities, the corresponding probabilities associated with the visual feature vectors and the audio feature vectors are assigned weights based on a confidence measure.

43. The apparatus of claim 42, wherein the joint probabilities are used to search for an appropriate output signal representative of the audio signal.

44. The apparatus of claim 39, wherein the acoustic probabilities are used to search for a word hypothesis representative of the audio signal.

45. The apparatus of claim 44, wherein the word hypothesis is re-calculated using the visual probabilities to generate an appropriate output signal representative of the audio signal.

46. The apparatus of claim 38, wherein visual feature vectors are combined with corresponding audio feature vectors to form audio-visual feature vectors.

47. The apparatus of claim 46, wherein probabilities are assigned to one of phonemes and visemes based on the audio-visual feature vectors.

48. The apparatus of claim 47, wherein the probabilities are used to search for an appropriate output signal representative of the audio signal.

49. The apparatus of claim 27, wherein at least one of the video signal and the audio signal are compressed signals.

50. The apparatus of claim 27, wherein compressed signals are decompressed prior to processing operations.

51. The apparatus of claim 27, wherein the arbitrary content video source provides MPEG-2 standard signals.

52. The apparatus of claim 27, wherein the video signal includes at least one of visible electromagnetic spectrum images, non-visible electromagnetic spectrum images, and images from other sensing techniques.

53. The apparatus of claim 27, wherein a speech detection decision is made using information from at least one of the video signal, the audio signal, and a correlation between the video signal and the audio signal.

54. A method of providing speech recognition, the method comprising the steps of:
processing an image signal associated with an arbitrary content image source;
processing an audio signal associated with the image signal; and
recognizing at least a portion of the processed audio signal, using at least a portion of the processed image signal, to generate an output signal representative of the audio signal.

55. Apparatus for providing speech recognition, the apparatus comprising:
at least one processor operable to: (i) process an image signal associated with an arbitrary content image source, (ii) process an audio signal associated with the image signal, and (iii) recognize at least a portion of the processed audio signal, using at least a portion of the processed image signal, to generate an output signal representative of the audio signal; and
memory, coupled to the at least one processor, for storing at least a portion of results associated with at least one of the processing and recognizing operations.

56. Apparatus for providing speech recognition, the apparatus comprising:
means for processing a video signal associated with an arbitrary content video source;
means for processing an audio signal associated with the video signal; and
means for recognizing at least a portion of the processed audio signal, using at least a portion of the processed video signal, to generate an output signal representative of the audio signal.

* * * * *